Nov. 25, 1952 A. H. WILLIAMS 2,619,369
SEAL
Filed July 31, 1946 3 Sheets-Sheet 1

INVENTOR.
Arthur H. Williams
BY
Thiess, Olson & Mecklenburger
Attys.

Nov. 25, 1952  A. H. WILLIAMS  2,619,369
SEAL
Filed July 31, 1946  3 Sheets-Sheet 2
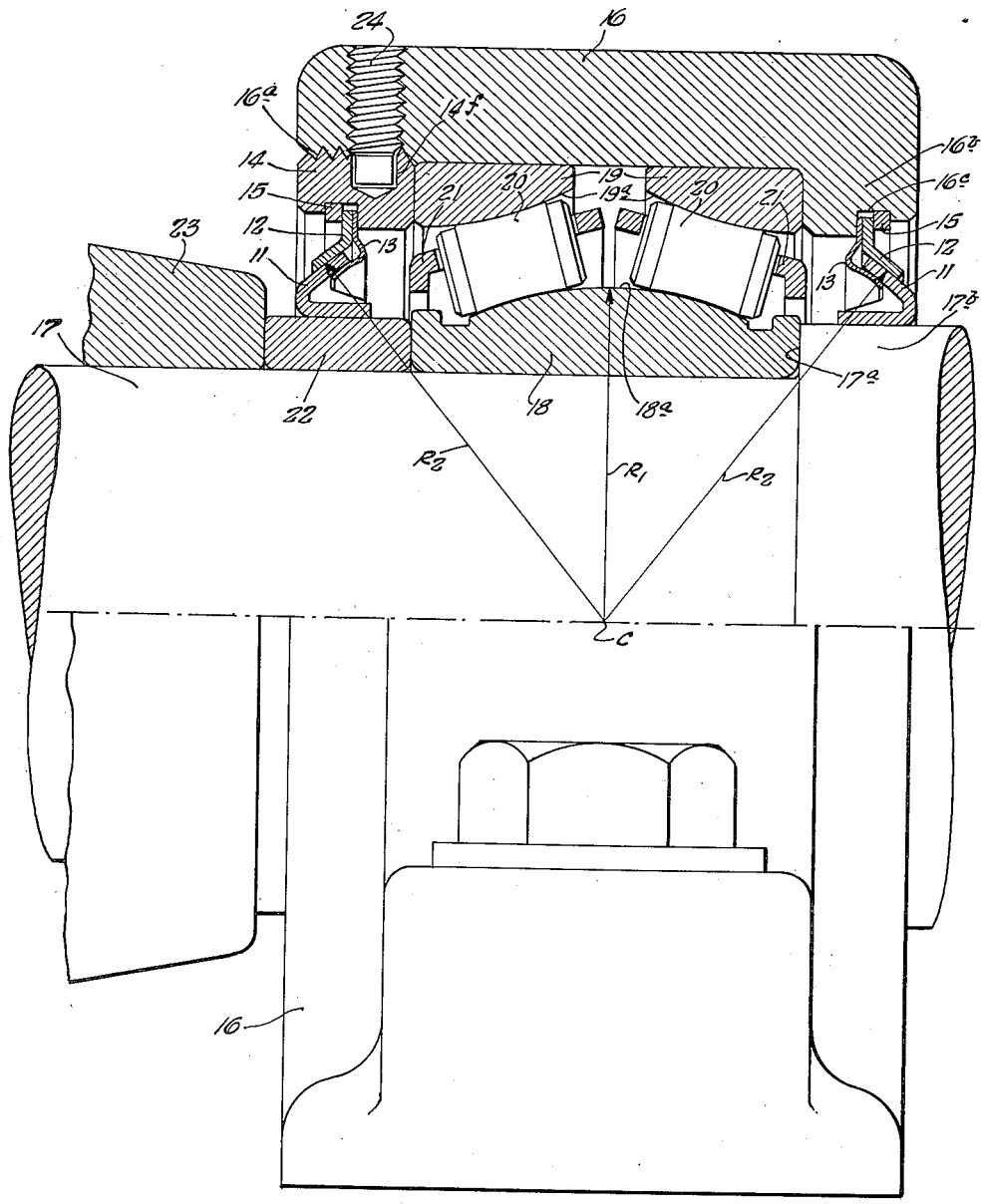
INVENTOR.
Arthur H. Williams
BY
Thiess, Olson & Mecklenburger
Attys.

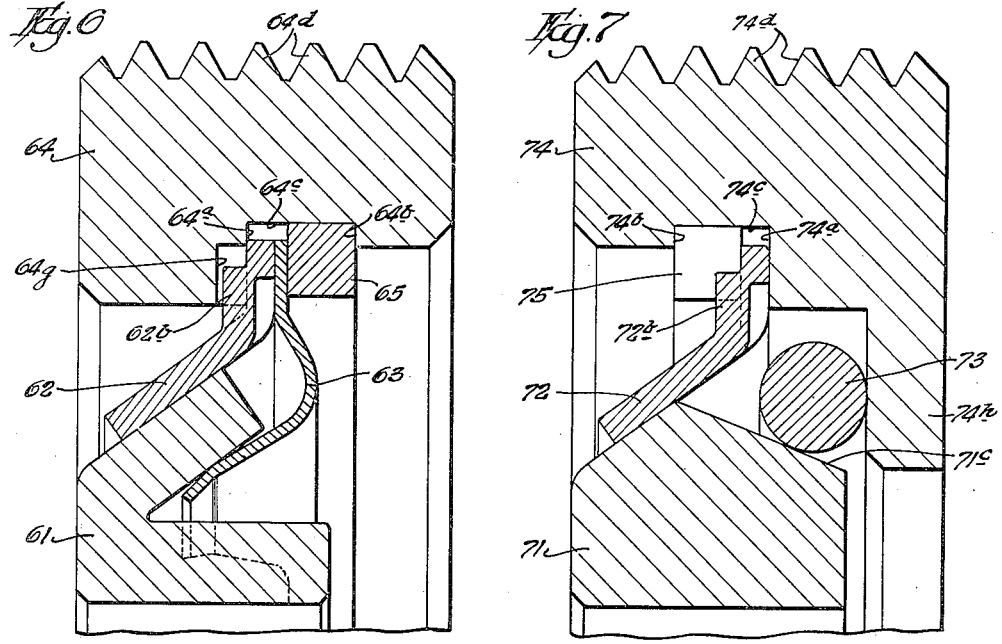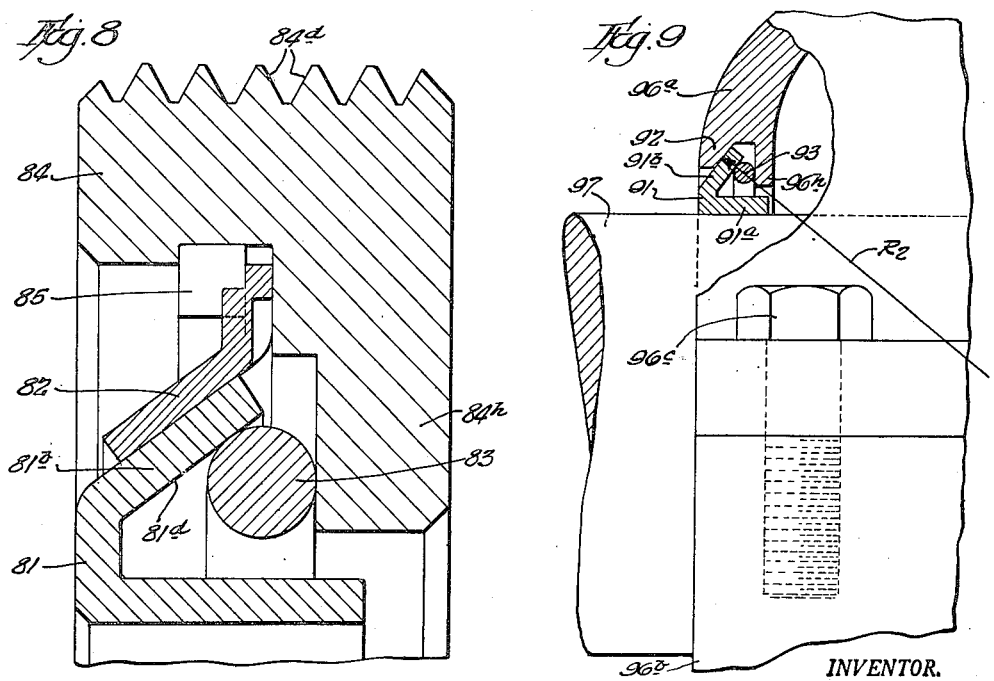

Patented Nov. 25, 1952

2,619,369

UNITED STATES PATENT OFFICE 2,619,369

SEAL

Arthur H. Williams, Riverside, Ill., assignor to Shafer Bearing Corporation, Chicago, Ill., a corporation of Illinois Application July 31, 1946, Serial No. 687,275

18 Claims. (Cl. 288—3)

1

This invention relates to seals and has particular relation to self-aligning seals suitable for use between rotating shafts mounted for self-alignment or other limited oscillatory movement and housings or the like through which such shafts extend.

The primary object of the invention is to provide a seal capable of accommodating itself to self-aligning or other oscillating movements of rotating shafts or the like in connection with which such seals are used.

Another object of the invention is to provide a seal of the above-indicated character which is also capable of accommodating itself to radial displacement of the rotating shafts or the like.

Another object of the invention is to provide a seal of the above-indicated character which is unaffected by axial floating movements of the rotating shafts or the like.

A further object is to provide a seal of the above-indicated character which is effective to exclude dirt and other foreign matter and to retain lubricant in constructions wherein such seals are needed, while introducing a minimum of friction and wear and requiring a minimum of attention and replacement.

A still further object is to provide a seal of the above-indicated character which can be economically manufactured, assembled and installed and conveniently handled as a compact unit assembly readily adaptable to a variety of applications.

According to one embodiment of the invention the seal assembly comprises a seal element of annular form and of channel shape in cross section, having a cylindrical bore therein adapted to engage a rotating shaft or the like in sealing relationship and having a second sealing surface conforming substantially to spherical curvature about a center point located on the axis of the said cylindrical bore but axially offset therefrom. A second seal element, also of annular form, coacts with the first-mentioned seal element and has a sealing surface mating with the second-mentioned sealing surface of the first-mentioned element. An annular resilient member is provided and arranged to urge the two seal elements into sealing contact at their mating surfaces, this resilient member and the second-mentioned seal element being mounted in a supporting ring or housing and retained in an internal annular recess therein by means of a C ring frictionally engaged in said recess. A protuberance on the seal element thus retained in the mounting ring is arranged to enter the gap in the C ring to prevent relative rotation between the said second seal element and the mounting ring. Provision is made for limited radial movement between the two last-mentioned parts by having the recess in the mounting ring of greater diameter than the seal element received thereby.

The channel-shaped cross section of the first-mentioned seal element is formed by inner and outer annular flanges thereof, the inner surface of the former and the outer surface of the latter constituting the first and second above-mentioned sealing surfaces thereof, respectively. The outer flange is embraced between the second seal element and the resilient member urging the first and second seal elements into sealing contact at their mating surfaces. Thus a compact and conveniently handled unit assembly of the entire seal construction is provided, whereby the same may be readily installed in and removed from any construction to which it is to be applied. The outer periphery of the mounting ring is screw-threaded for insertion into a correspondingly screw-threaded opening in a housing or the like in which the seal is to be installed, and the outer face of the mounting ring is suitably slotted for rotation by means of a spanner wrench or other appropriate tool.

When installed in the desired position in which it is to be used the seal assembly may be locked in place by means of suitable set screws or the like, and it will then serve as an effective seal between the shaft and housing or the like to which it is applied, while accommodating both self-aligning or other oscillatory movements of the shaft and radial displacements thereof, as well as introducing a minimum of friction opposing the rotation thereof and also permitting axial float of the shaft in constructions wherein such floating movement occurs or is apt to occur.

Other features and advantages of the invention will appear from a consideration of the detailed description appearing hereinafter, in conjunction with the accompanying drawings forming a part hereof, in which.

Figure 1:
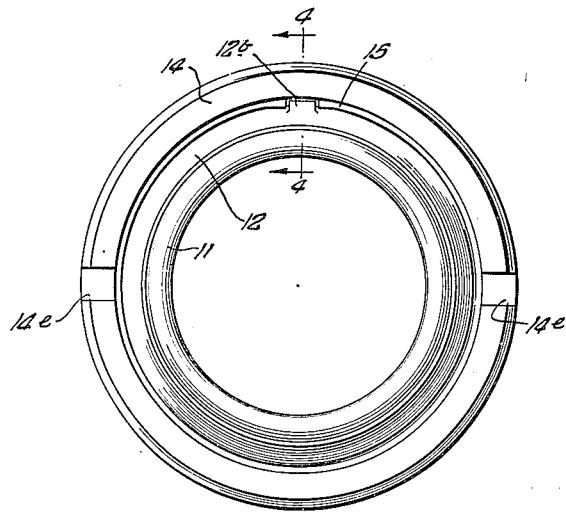
Fig. 1 is a front elevational view of a seal assembly embodying the invention.
Figure 2:
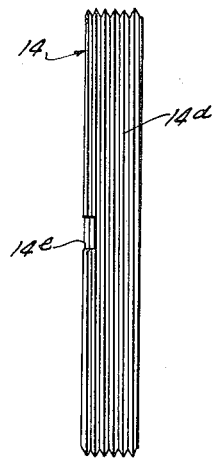
Fig. 2 is a side elevational view of the said assembly.
Figure 3:
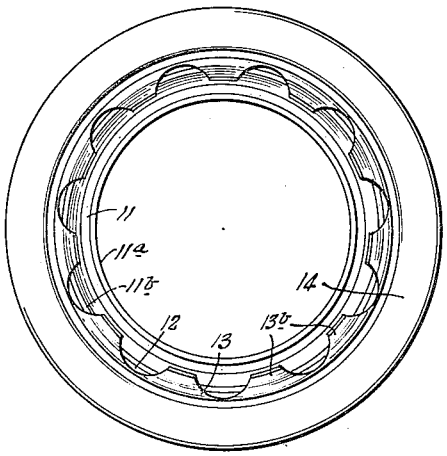
Fig. 3 is a rear elevational view of the same.
Figure 4:
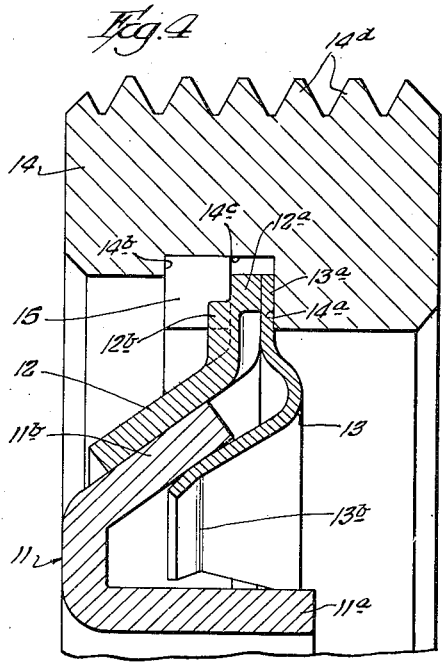
Fig. 4 is a fragmentary sectional view, on a larger scale, taken on a plane indicated by the line 4—4 in Fig. 1.

Fig. 5 is a view, partly in side elevation and partly in section, illustrating the application of seals embodying the invention to a rotating shaft and a housing through which the same extends, with provision for self-aligning movements of the shaft relative to the housing, the latter being illustrated in this instance as a pillow block or the like carrying a self-aligning bearing supporting the shaft;

Figs. 6, 7 and 8 are fragmentary sectional views on the same order as Fig. 4 but illustrating various modifications of the invention, and Fig. 9 is a fragmentary view, partly in side elevation and partly in section, of a construction embodying a further modification of the invention, comprising a seal coacting directly between a shaft and a housing through which the latter extends.

Referring first to Figs. 1 to 4 of the drawing, the seal assembly illustrated therein comprises a first seal element 11 of annular form and channel shape in cross section having inner and outer annular flanges 11a and 11b, respectively. The inner surface of the inner flange 11a constitutes a cylindrical bore adapted to fit a rotating shaft or the like in free running relationship whereby sealing engagement between the shaft and the cylindrical bore is provided. The outer surface of the outer annular flange 11b is substantially spherically curved or angularly inclined to conform substantially to spherical curvature about a center point located on the axis of the cylindrical bore of the inner flange 11a but axially offset therefrom. This center point coincides with the center of oscillation of the shaft or the like to which the seal is to be applied, as will be explained more fully hereinafter.

A second seal element 12 which is also of annular form has an inclined or curved inner surface mating with the outer surface of the flange 11b of the seal element 11, to maintain sealing relationship between these surfaces as long as the same are maintained in contact with each other. Such contact is effected by means of an annular resilient member 13 having a flat outer marginal portion 13a and a plurality of prong or finger portions 13b extending radially inwardly and axially outwardly therefrom into resilient engagement with the inner surface of the outer flange portion 11b of the seal element 11. The said flange portion 11b is thus embraced between the second seal element 12 and the resilient prong portions 13b of the member 13 so that the mating outer surface of the flange portion 11b and inner surface of the seal element 12 are maintained in intimate contact providing a sealing relationship between these surfaces.

The seal element 12 has a flat outer marginal portion 12a of the same peripheral diameter as the portion 13a of the member 13. These members are assembled within a mounting ring or seal housing member 14 which is of annular form and which is provided with an internal shoulder 14a facing toward one side thereof and an internal shoulder 14b of lesser depth facing toward the opposite side thereof so that an annular recess 14c is formed therebetween. The bore of the member 14 through the shoulder portion 14b thereof is of sufficient diameter to pass the members 13 and 12 which are inserted therein in the order named so that the member 13 abuts against the face of the shoulder portion 14a and the member 12 abuts against the member 13 as shown. A C ring 15 of proper size and character to expand resiliently within the recess 14c is then compressed sufficiently to pass through the bore of the member 14 within the shoulder portion 14b and is seated in the recess 14c in overlying relationship to the seal element 12 as shown, thus retaining the members 12 and 13 within the recess 14c until the C ring 15 is removed.

The aggregate thickness of the members 12, 13 and 15 is such as to substantially equal the width of the recess 14c so that the members 12 and 13 are held in snugly assembled relationship in said recess by a moderate amount of frictional engagement between the faces of said members and the opposed faces of the shoulder 14a and the C ring 15. Such frictional engagement is insufficient, however, to effect substantial restraint upon radial movement of the members 12 and 13, and these members are made of substantially smaller peripheral diameter than the internal diameter of the recess 14c so that such radial movement may be accommodated for a purpose to be described hereinafter. Relative rotation between these parts is not desired, however, and for the purpose of restraining such relative movement the seal element 12 is provided with a protuberance 12b adapted to fit into the gap in the C ring 15, the frictional engagement between the latter and the member 14 being sufficient to prevent relative rotation of these parts, and engagement of the protuberance 12b with the ends of the C ring 15 serving to prevent such relative rotation on the part of the seal element 12.

The mounting ring or seal housing 14 is provided with external screw threads 14d whereby this member may be screwed into a correspondingly screw-threaded opening in a housing or the like in which the seal is to be used. The outer face of the member 14 is slotted as shown at 14e for engagement by a spanner wrench or other suitable tool whereby the member 14, carrying the entire seal assembly, may be screwed into and out of such housing or the like.

It will be understood, of course, that the various parts of the seal construction are made of materials suitable for the purposes intended. The seal elements 11 and 12, for example, may be made of suitable sheet metal or other kinds of metal formed or machined to the desired dimensions and finishes; the resilient member 13 may be formed of sheet metal or other material having suitable spring characteristics; the member 14 may be machined from a suitable casting or other blank; and the C ring 15 may be formed of suitable spring wire tempered or otherwise treated to provide the desired resilient characteristics. Nonmetallic parts may also be used.

Fig. 5 shows a seal of the construction illustrated in Figs. 1 to 4, installed in one end of a housing 16 and coacting between said housing and a rotatable shaft 17 extending therethrough. The housing illustrated is of the pillow block type and houses an antifriction bearing of a well-known self-aligning type comprising an inner race member 18 having a bearing surface 18a of substantially spherical curvature, a pair of outer race members 19 having opposed bearing surfaces 19a of curvature substantially complementary to that of the bearing surface 18a of the inner race member, and two annular series of bearing rollers 20 retained in bearing position between the inner race member 18 and the respective outer race members 19 by means of retainers 21. The rollers 20 have concave surfaces as shown, conforming substantially to the bearing surfaces of the race members 18 and 19, and provide self-aligning support for the shaft 17 with respect to the pillow block housing 16 by reason of the substantially spherical curvature of the inner race member 18. This curvature is formed on or about a radius $R_1$ about a center point C located on the axis of the shaft 17, which center point is therefore the center of oscillation of the shaft 17 with respect to the housing 16. The seal elements 11 and 12 of the seal construction hereinbefore referred to are made to conform substantially to spherical curvature on a radius $R_2$ about the same center point C.

The bearing race member 18 is press-fitted to the shaft 17 against a shoulder 17a thereon, and a spacing sleeve 22 is secured to the shaft outwardly of the said race member, either by having a press fit thereon or by suitable securing means such as set screws (not shown). Alternatively, or in addition, the sleeve 22 may be secured against rotation relative to the shaft 17 by axial clamping action effected by means of a driving or driven element 23, such as the hub of a gear or the like which is fixedly secured to the shaft 17 and which may, if desired, be forced against the sleeve 22 to clamp it against the bearing race member 18, which in turn is forced against the shoulder 17a of the shaft 17. The sleeve 22 is thus secured in fixed relation to the shaft 17 and will rotate therewith.

The cylindrical bore of the seal element 11 has a free running fit and sealing relationship with the outer circumferential surface of the sleeve member 22 so that the left-hand end of the housing 16 is completely sealed by the seal construction hereinbefore described. The seal assembly is screwed into the opening at that end of the housing, which is provided with screw threads 16a for that purpose, and is locked in the desired adjusted position by means of a set screw 24 which is screwed into a threaded bore in the housing and into a recess 14f which is counter-bored into the mounting ring or housing 14 for the seal after the latter has been adjusted to the desired position in the housing 16. It will be understood, of course, that one or more additional set screws 24 may be provided at any desired radial spacing from the one shown in the drawing. The member 14, in addition to carrying the seal construction, may, if desired, serve to provide a suitable axial adjustment for the antifriction bearing outer race members 19, but need not necessarily be utilized to perform this function.

The right-hand end of the housing 16 shown in Fig. 5 is sealed by means of a seal having parts 11, 12, 13 and 15 which are the same, respectively, as the like numbered parts of the seal already described at the left-hand end of the housing. Instead of utilizing a mounting ring or separate seal housing 14, however, the housing 16 is provided with an integral inwardly extending annular flange portion 16b having internal shoulders forming an annular recess 16c corresponding to the recess 14c in the member 14 described with reference to Fig. 4. The right-hand seal, therefore, is assembled directly in the housing 16 in the same manner that the left-hand seal is assembled in the ring or separate housing member 14. The positioning of the right-hand seal in the assembled construction is such that the mating seal surfaces of the seal elements 11 and 12 conform substantially to spherical curvature on the same radius $R_2$ about the same center of oscillation C as described with reference to the left-hand seal.

The shoulder 17a on the shaft 17 is formed by the end face of an enlarged-diameter portion 17b of the said shaft which is of the same outside diameter as the sleeve 22 and upon which the seal element 11 of the right-hand seal has a free running and sealing fit in the same manner that the corresponding seal element fits upon the sleeve 22 at the other end of the housing. In the type of construction shown at the right-hand side of Fig. 5, therefore, the seal coacts directly between the housing 16 and the shaft 17 to form a complete seal for this end of the housing. The interior of the housing 16 is thus completely sealed by the two seals at the opposite ends thereof, whereby infiltration of dirt and other foreign matter into the housing and escape of lubricant therefrom are prevented.

By reason of the substantially spherical formation of the mating surfaces of the seal elements 11 and 12 in the seals at both ends of the housing 16, about the center point C which constitutes the center of oscillation of the shaft 17 with respect to the said housing, the said seals automatically adjust themselves to all angular displacements of the shaft relative to the housing, while still maintaining fully effective sealing relationship with each other. In addition, the formation of the recesses 14c and 16c in which the respective seals are assembled, with diameters substantially greater than the peripheral diameters of the members 12 and 13, permits automatic adjustment of the seals in all radial directions. This is particularly desirable in the seal construction utilizing the separate mounting ring or housing 14 because such member may not be positioned in the assembled structure in perfect concentricity with the shaft 17, either due to machining or mounting errors or to radial drop of the bearing or other shaft support after the same has become appreciably worn in use. All radial displacements of the shaft are thus compensated for by the automatic radial adjustability of the seals without disturbing the sealing relationship between the coacting seal elements in any way.

The relative rotary movement between the shaft 17 and the housing 16 is accommodated by the free running fit of the seal elements 11 upon the shaft portion 17b and the sleeve member 22, without introduction of any appreciable running friction. The cylindrical bores in the seal elements 11 need have only very slight clearance with respect to the surfaces upon which they are fitted to run, and they are of sufficient axial length to preclude the passage of foreign matter or lubricant along their running surfaces.

Still another type of relative movement between the shaft and housing which is accommodated by the seals is movement in an axial direction. Since the seal elements 11 have cylindrical bores fitted to cylindrical relatively rotating surfaces, any desired degree of axial float of the shaft relative to the housing is accommodated without any effect upon the operation of the seals. While no appreciable degree of such axial float is normally provided for in a construction such as that illustrated in Fig. 5, there may be a limited amount thereof, particularly after the shaft-supporting bearing has become worn in use, and in any event there are many other types of construction to which the seals are adapted, wherein axial float of the shaft is a normal operating condition.

It will be seen, therefore, that the seals embodying the present invention are effective to provide entirely tight sealing between a shaft and a housing or the like having any type of relative movement, the different types of movement being provided for at different points in the seal construction, except that the cylindrical bores of the inner seal elements 11 accommodate both relative rotation and axial float. Self-aligning or other oscillating movements of the shaft relative to the housing are separately accommodated by the substantially spherical mating surfaces of the seal elements 11 and 12, these elements being restrained against rotation relative to the housing by the C rings 15 frictionally engaging the walls of the recesses in the housings or mounting members in which the seals are assembled, which rings receive in the gaps therein the protuberances 12b on the seal elements 12 as described with reference to Figs. 1 to 4. The elements 11 and 12, therefore, have only oscillatory relative movement, except that in the initial seating of the seals when they are placed in operation the elements 11 may rotate to a small extent until they become adjusted to their freest running positions. Normally, however, the antirotational friction between the seal elements 11 and 12, due to the same being pressed relatively tightly together by the resilient members 13, is much greater than that between the elements 11 and the shaft or sleeve upon which the same run, so that the relative rotation of the parts is confined to the latter members.

The relative radial movement accommodated by the seals is normally only an initial adjustment or a very slight and gradual adjustment occurring as the shaft drops slightly due to wear of the bearings or other shaft supports in use. In many types of construction, however, it is important that this adjustment be provided for in order that the seals may be automatically positioned for maximum effectiveness in accommodating the other types of relative movement between the parts involved.

Assembly of the seal constructions is a very simple matter, involving merely the placing of the parts in their proper relative positions wherein they are locked together by the C rings 15 until such time as there may be any occasion to disassemble them, which may be done by the reverse procedure with equal ease. When assembled either in a separate mounting ring or housing member 14 or directly in the main housing 16 the seals are securely held in such assembled relationship and are very easy to install in any desired application.

Fig. 6 shows a modified seal construction embodying the invention, comprising inner and outer seal elements 61 and 62, respectively, and a resilient member 63 assembled in a mounting ring or seal housing 64 by means of a C ring 65, in generally similar fashion to the mounting of the corresponding parts in the construction illustrated in Figs. 1 to 4. In Fig. 6, however, the parts are assembled within the member 64 from the opposite or rear side thereof, and the said member is accordingly formed with shoulder portions 64a and 64b in opposite relative positions, providing a recess 64c into which the parts of the seal construction to be assembled therein are inserted from the opposite side. External screw threads 64d are provided on the member 64 for mounting purposes as hereinbefore described.

The seal elements 61 and 62 are formed with sealing surfaces substantially similar to the corresponding elements of the construction shown in Figs. 1 to 4, but the element 61 is shown as being of substantially heavier material in cross section. This element may be suitably made of cast metal and its surfaces machined or otherwise finished as desired. The seal element 62 is provided with a protuberance 62b fitting within a slot 64g formed in the adjacent shoulder portion 64a of the member 64 to prevent rotation of the seal element 62 relative thereto.

Fig. 7 shows another modification of the invention comprising inner and outer seal elements 71 and 72, respectively, and a contractive annular spring 73 assembled within a mounting ring or seal housing 74 by means of a C ring 75. The seal elements 71 and 72 are provided with sealing surfaces similar to those in the forms of construction previously described, but the element 71 in this case is shown as a solid annular member which may be a machined casting or may be made of compressed powdered metal for self-lubricating purposes, if desired. The member 74 is formed with shoulder portions 74a and 74b providing an internal annular recess 74c within which the seal element 72 is retained by the C ring 75 receiving a protuberance 72b of the said seal element within the gap thereof for the same purpose previously described. Screw threads 74d are likewise provided on the outside of the member 74 as in the previously described forms of construction and for the same purpose.

The member 74 is further formed with an internally extending annular flange portion 74h against the inside face of which the contractive spring 73 bears. This spring is in the form of a C ring and also bears on an inclined surface 71c of the inner seal element 71, whereby said element is resiliently urged outwardly against the seal element 72 to maintain sealing relationship between said elements. The spring 73 thus replaces the resilient annular members 13 and 63 of the forms of construction previously described and eliminates need for assembling such members in the recess 74c of the member 74 along with the seal element 72.

Fig. 8 shows another modification of the invention comprising inner and outer seal elements 81 and 82, respectively, and an expansive annular spring member 83 urging said elements into sealing relationship with each other, all assembled within a mounting ring or seal housing 84 having external screw threads 84d thereon, by means of a C ring 85, in similar fashion to the assembly of the corresponding elements of Fig. 7. The inner seal element 81, however, is similar in form to the corresponding element 11 of Figs. 1 to 4, and the spring 83 bears between the inside face of an inwardly extending annular flange portion 84h of the member 84 and an inclined inner surface 81d of the outer flange portion 81b of the element 81. In this manner the resilient expansive action of the spring 83, which is in the form of a C ring, urges the seal elements 81 and 82 into sealing relationship with each other at their mating surfaces as in the previously described forms of construction. In other respects the construction of Fig. 8 is similar to that of Fig. 7.

Fig. 9 illustrates a still further modification of the invention involving a self-aligning seal coacting directly between a rotating shaft and a housing through which the shaft extends. The seal comprises a seal element 91 having a cylindrical bore constituting an inner sealing surface, and having an outer sealing surface conforming substantially to spherical curvature on a radius $R_2$ about a center point (not shown) located on the axis of the said cylindrical bore but axially offset therefrom. A coacting seal element 92 is provided with an internal sealing surface mating with the outer sealing surface of the element 91, and the two seal elements are urged into sealing contact at these mating surfaces by means of an expanding annular spring member 93.

In this construction the seal element 92 is formed integrally with a split housing having upper and lower portions 96a and 96b, respectively, secured together by a plurality of cap screws 96c (only one of which is shown). The spring member 93 bears between an inclined inner surface of the outer flange 91b of the seal element 91 and an inwardly extending annular flange portion 96h which is formed integrally with the housing portions 96a and 96b. The expansive force of the spring 93 acting between these annularly convergent surfaces causes the sealing outer surface of the flange 91b of the seal element 91 to be resiliently urged into sealing contact with the mating sealing surface of the seal element 92.

A rotatable shaft 97 extends through the split housing and is circumferentially engaged in sealing relationship by the first-mentioned sealing surface of the seal element 91 constituting the cylindrical bore therethrough. The shaft 97 may have any self-aligning or other mounting with respect to the housing through which it extends, whereby limited relative oscillatory movement occurs or is apt to occur between said shaft and housing, and the seal construction is so designed that the center of substantially spherical curvature of the mating sealing surfaces of the seal elements 91 and 92 coincides with the center of such oscillation. Therefore, the seal automatically accommodates itself to such oscillation at the mating surfaces of the elements 91 and 92 without disturbing the sealing relationship therebetween, while the internal sealing surface of the element 91 maintains sealing relationship with the shaft 97 and accommodates axial floating movements as well as rotation of the latter.

In the assembly of this construction the seal element 91 and the spring member 93 are assembled in proper relationship to the lower housing portion 96b, and the upper housing portion 96a is then brought down on top of the same and secured to the lower housing element by means of the cap screws 96c, with the outer flange 91b of the seal element 91 and the spring member 93 entering the semiannular opening or recess between the seal element 92 and the flange portion 96h of the upper housing portion and the complementary semiannular opening or recess in the lower housing portion.

It will be observed that the construction shown in Fig. 9 does not provide for radial adjustment of the seal to accommodate radial displacement between the shaft and the housing. In some applications it is necessary to accommodate only oscillatory movement of the shaft relative to the housing, as well as rotation of the shaft either with or without axial float thereof, and for such applications, involving the use of any kind of split housing, the construction illustrated in Fig. 9 will accomplish the desired results.

It will be apparent from the foregoing that the present invention provides a highly effective seal for use between rotating shafts and housings or the like through which the same extend, wherein relative oscillation occurs or is apt to occur between the parts to which the seal is applied. In addition, provisions may be made, if desired, for either relative radial displacement of the parts or relative axial movements therebetween, or both. The seal may be either assembled as a separate compact unit suitable for ready installation in a variety of applications or may be incorporated initially in any desired machine element construction made to receive the same.

Both the features of radial adjustability and axial float are optional and may be included or omitted as desired. It will be seen that in case the provision for axial float is to be omitted the sealing surface between the first seal element and the rotating shaft or the like may be any surface of rotation about the axis of such shaft or the like and need not necessarily be a cylindrical surface.

While various embodiments of the invention have been illustrated and described herein, it will be understood by those skilled in the art that various changes and modifications may be made therein without departing from the spirit and the scope of the invention as set forth in the appended claims.

What is claimed as new and is desired to be secured by Letters Patent, therefore, is:

1. A seal comprising a pair of coacting rigid seal elements, one of said elements having a sealing surface constituting a surface of revolution adapted to engage a relatively rotatable member in sealing but non-load-bearing relationship and having a second sealing surface conforming substantially to spherical curvature about a center point located on the axis of said surface of revolution, and the other of said elements having a surface mating with said second sealing surface of said first-mentioned element, said elements being relatively oscillatable about said center point, and means urging said elements into sealing contact at said mating surfaces with forces acting substantially normally thereto and effecting only frictional restraint upon relative oscillation therebetween.

2. A seal comprising a pair of coacting rigid seal elements, one of said elements having a sealing surface constituting a surface of revolution adapted to engage a relatively rotatable member in sealing but non-load-bearing relationship and having a second sealing surface conforming substantially to spherical curvature about a center point located on the axis of said surface of revolution but axially offset therefrom, and the other of said elements having a surface mating with said second sealing surface of said first-mentioned element, said elements being relatively oscillatable about said center point, and means urging said elements into sealing contact at said mating surfaces with forces acting substantially normally thereto and effecting only frictional restraint upon relative oscillation therebetween.

3. A seal comprising a pair of coacting rigid seal elements, one of said elements having a sealing surface constituting a surface of revolution adapted to engage a relatively rotatable member in sealing but non-load-bearing relationship and having a second sealing surface conforming substantially to spherical curvature about a center point located on the axis of said surface of revolution, and the other of said elements having a surface mating with said second sealing surface of said first-mentioned element, said elements being relatively oscillatable about said center point, and means urging said elements into sealing contact at said mating surfaces with forces acting substantially normally thereto and effecting only frictional restraint upon relative oscillation therebetween and restraining relative rotation therebetween.

4. A seal comprising a pair of coacting rigid seal elements, one of said elements having a cylindrical sealing surface adapted to engage a cylindrical surface of a relatively rotatable member in sealing but non-load-bearing relationship and having a second sealing surface conforming substantially to spherical curvature about a center point located on the axis of said cylindrical sealing surface, and the other of said elements having a surface mating with said second sealing surface of said first-mentioned element, said elements being relatively oscillatable about said center point, and means urging said elements into sealing contact at said mating surfaces with forces acting substantially normally thereto and effecting only frictional restraint upon relative oscillation therebetween.

5. A seal comprising a pair of coacting rigid seal elements, one of said elements having a sealing surface constituting a surface of revolution adapted to engage a relatively rotatable member in sealing but non-load-bearing relationship and having a second sealing surface conforming substantially to spherical curvature about a center point located on the axis of said surface of revolution, and the other of said elements having a surface mating with said second sealing surface of said first-mentioned element, said elements being relatively oscillatable about said center point, means urging said elements into sealing contact at said mating surfaces with forces acting substantially normally thereto and effecting only frictional restraint upon relative oscillation therebetween, and means supporting said second-mentioned element and forming a housing for the seal.

6. A seal comprising a pair of coacting rigid seal elements, one of said elements having a sealing surface constituting a surface of revolution adapted to engage a relatively rotatable member in sealing but non-load-bearing relationship and having a second sealing surface conforming substantially to spherical curvature about a center point located on the axis of said surface of revolution, and the other of said elements having a surface mating with said second sealing surface of said first-mentioned element, said elements being relatively oscillatable about said center point, means urging said elements into sealing contact at said mating surfaces with forces acting substantially normally thereto and effecting only frictional restraint upon relative oscillation therebetween, and means supporting said second-mentioned element and forming a housing for the seal, said supporting means being formed to coact with a shaft housing or the like in sealing relationship therewith.

7. A seal comprising a pair of coacting rigid seal elements, one of said elements having a sealing surface constituting a surface of revolution adapted to engage a relatively rotatable member in sealing but non-load-bearing relationship and having a second sealing surface conforming substantially to spherical curvature about a center point located on the axis of said surface of revolution, and the other of said elements having a surface mating with said second sealing surface of said first-mentioned element, said elements being relatively oscillatable about said center point, means urging said elements into sealing contact at said mating surfaces with forces acting substantially normally thereto and effecting only frictional restraint upon relative oscillation therebetween, and means supporting said second-mentioned element and forming a housing for the seal, said supporting means being annular in form and externally screw-threaded to fit into a screw-threaded opening in a shaft housing or the like in sealing relationship therewith.

8. A seal comprising a pair of coacting rigid seal elements, one of said elements having a sealing surface constituting a surface of revolution adapted to engage a relatively rotatable member in sealing but non-load-bearing relationship and having a second sealing surface conforming substantially to spherical curvature about a center point located on the axis of said surface of revolution, and the other of said elements having a surface mating with said second sealing surface of said first-mentioned element, said elements being relatively oscillatable about said center point, means urging said elements into sealing contact at said mating surfaces with forces acting substantially normally thereto and effecting only frictional restraint upon relative oscillation therebetween, and means supporting said second-mentioned element and forming a housing for the seal, said supporting means being formed to accommodate limited radial movement of the seal element supported thereby.

9. A seal comprising a pair of coacting rigid seal elements, one of said elements having a sealing surface constituting a surface of revolution adapted to engage a relatively rotatable member in sealing but non-load-bearing relationship and having a second sealing surface conforming substantially to spherical curvature about a center point located on the axis of said surface of revolution, and the other of said elements having a surface mating with said second sealing surface of said first-mentioned element, said elements being relatively oscillatable about said center point, means urging said elements into sealing contact at said mating surfaces with forces acting substantially normally thereto and effecting only frictional restraint upon relative oscillation therebetween, supporting means having an annular recess therein receiving said second-mentioned element, and means securing said element in said recess.

10. A seal comprising a pair of coacting rigid seal elements, one of said elements having a sealing surface constituting a surface of revolution adapted to engage a relatively rotatable member in sealing but non-load-bearing relationship and having a second sealing surface conforming substantially to spherical curvature about a center point located on the axis of said surface of revolution, and the other of said elements having a surface mating with said second sealing surface of said first-mentioned element, said elements being relatively oscillatable about said center point, means urging said elements into sealing contact at said mating surfaces with forces acting substantially normally thereto and effecting only frictional restraint upon relative oscillation therebetween, supporting means having an annular recess therein receiving said second-mentioned element, and means securing said element in said recess, said recess being of substantially greater diameter than said element whereby limited radial movement of the latter with respect to said supporting means is accommodated.

11. A seal comprising a pair of coacting rigid seal elements, one of said elements having a sealing surface constituting a surface of revolution adapted to engage a relatively rotatable member in sealing but non-load-bearing relationship and having a second sealing surface conforming substantially to spherical curvature about a center point located on the axis of said surface of revolution, and the other of said elements having a surface mating with said second sealing surface of said first-mentioned element, said elements being relatively oscillatable about said center point, means urging said elements into sealing contact at said mating surfaces with forces acting substantially normally thereto and effecting only frictional restraint upon relative oscillation therebetween, supporting means having an annular recess therein receiving said second-mentioned element, means securing said element in said recess, and means restraining relative rotation between said element and said supporting means.

12. A seal comprising a pair of coacting rigid seal elements, one of said elements having a sealing surface constituting a surface of revolution adapted to engage a relatively rotatable member in sealing but non-load-bearing relationship and having a second sealing surface conforming substantially to spherical curvature about a center point located on the axis of said surface of revolution, and the other of said elements having a surface mating with said second sealing surface of said first-mentioned element, said elements being relatively oscillatable about said center point, means urging said elements into sealing contact at said mating surfaces with forces acting substantially normally thereto and effecting only frictional restraint upon relative oscillation therebetween, supporting means having an annular recess therein receiving said second-mentioned element, and a removable C ring securing said element in said recess.

13. A seal comprising a pair of coacting rigid seal elements, one of said elements having a sealing surface constituting a surface of revolution adapted to engage a relatively rotatable member in sealing relationship and having a second sealing surface conforming substantially to spherical curvature about a center point located on the axis of said surface of revolution, and the other of said elements having a surface mating with said second sealing surface of said first-mentioned element, said elements being relatively oscillatable about said center point, means urging said elements into sealing contact at said mating surfaces, supporting means having an annular recess therein receiving said second-mentioned element, and a C ring securing said element in said recess and frictionally engaging said supporting means, said element having a protuberance lying within the gap in said C ring to restrain relative rotation between said element and said supporting means.

14. A seal comprising a pair of coacting rigid seal elements, one of said elements having a sealing surface constituting a surface of revolution adapted to engage a relatively rotatable member in sealing but non-load-bearing relationship and having a second sealing surface conforming substantially to spherical curvature about a center point located on the axis of said surface of revolution, and the other of said elements having a surface mating with said second sealing surface of said first-mentioned element, said elements being relatively oscillatable about said center point, resilient means of annular form urging said elements into sealing contact at said mating surfaces with forces acting substantially normally thereto and effecting only frictional restraint upon relative oscillation therebetween, supporting means having an annular recess therein receiving said second-mentioned element and said resilient means, and means securing said element and said resilient means in said recess.

15. A seal comprising a pair of coacting rigid seal elements, one of said elements having a sealing surface constituting a surface of revolution adapted to engage a relatively rotatable member in sealing but non-load-bearing relationship and having a second sealing surface conforming substantially to spherical curvature about a center point located on the axis of said surface of revolution, and the other of said elements having a surface mating with said second sealing surface of said first-mentioned element, said elements being relatively oscillatable about said center point, resilient means of annular form urging said elements into sealing contact at said mating surfaces with forces acting substantially normally thereto and effecting only frictional restraint upon relative oscillation therebetween, supporting means having an annular recess therein receiving said second-mentioned element and said resilient means, and means securing said element and said resilient means in said recess, the said secured parts being assembled with said first-mentioned element embraced therebetween to produce a unitary seal assembly.

16. A seal comprising a pair of coacting rigid seal elements, one of said elements having a sealing surface constituting a surface of revolution adapted to engage a relatively rotatable member in sealing but non-load-bearing relationship and having a second sealing surface conforming substantially to spherical curvature about a center point located on the axis of said surface of revolution, and the other of said elements having a surface mating with said second sealing surface of said first-mentioned element, said elements being relatively oscillatable about said center point, means urging said elements into sealing contact at said mating surfaces with forces acting substantially normally thereto and effecting only frictional restraint upon relative oscillation therebetween, and means supporting said second-mentioned element and forming a housing for the seal, said second-mentioned element and said urging means being assembled with said first-mentioned element resiliently engaged therebetween to produce a unitary seal assembly.

17. A seal comprising a pair of coacting rigid seal elements, one of said elements having a sealing surface constituting a surface of revolution adapted to engage a relatively rotatable member in sealing relationship and having a second sealing surface conforming substantially to spherical curvature about a center point located on the axis of said surface of revolution, and the other of said elements having a surface mating with said second sealing surface of said first-mentioned element, said elements being relatively oscillatable about said center point, means supporting said second-mentioned element and forming a housing for the seal, and annular spring means coacting between annularly convergent surfaces of said first-mentioned element and said supporting means to urge said elements into sealing contact at said mating surfaces.

18. A seal comprising a pair of coacting rigid seal elements, one of said elements having a sealing surface constituting a surface of revolution adapted to engage a relatively rotatable member in sealing but non-load-bearing relationship and having a second sealing surface conforming substantially to spherical curvature about a center point located on the axis of said surface of revolution, and the other of said elements having a surface mating with said second sealing surface of said first-mentioned element, said elements being relatively oscillatable about said center point, and means urging said elements into sealing contact at said mating surfaces with forces acting only between said mating surfaces and substantially uniformly distributed circumferentially of the contact area under all operative conditions of axial angularity between said elements, whereby said means effect only frictional restraint upon relative oscillation between said elements.

ARTHUR H. WILLIAMS.

REFERENCES CITED

The following references are of record in the file of this patent:

UNITED STATES PATENTS

| Number | Name | Date |
|---|---|---|
| 1,506,140 | Smith | Aug. 26, 1924 |
| 1,793,190 | Philips | Feb. 17, 1931 |
| 2,086,872 | Leonard | July 13, 1937 |
| 2,202,908 | Hubbard | June 4, 1940 |
| 2,228,879 | Johnson et al. | Jan. 14, 1941 |
| 2,421,685 | Crot et al. | June 3, 1947 |
| 2,445,410 | Smith | July 20, 1948 |
| 2,462,067 | Buckendale | Feb. 22, 1949 |

FOREIGN PATENTS

| Number | Country | Date |
|---|---|---|
| 3,661 | Great Britain | of 1881 |
| 690,570 | Germany | of 1940 |